United States Patent
Noda et al.

(10) Patent No.: US 9,366,522 B2
(45) Date of Patent: Jun. 14, 2016

(54) FORM MEASURING APPARATUS AND FORM MEASUREMENT METHOD

(71) Applicant: MITUTOYO CORPORATION, Kanagawa (JP)

(72) Inventors: Takashi Noda, Shimotsuke (JP); Hiromi Deguchi, Shimotsuke (JP); Shoichi Todaka, Utsunomiya (JP)

(73) Assignee: MITUTOYO CORPORATION, Kanagawa (JP)

( * ) Notice: Subject to any disclaimer, the term of this patent is extended or adjusted under 35 U.S.C. 154(b) by 84 days.

(21) Appl. No.: 14/554,608

(22) Filed: Nov. 26, 2014

(65) Prior Publication Data
US 2015/0143708 A1    May 28, 2015

(30) Foreign Application Priority Data

Nov. 27, 2013    (JP) ................................. 2013-245155

(51) Int. Cl.
  *G01B 5/008*    (2006.01)
  *G01B 5/20*     (2006.01)
  *G01B 21/04*    (2006.01)
(52) U.S. Cl.
  CPC  *G01B 5/20* (2013.01); *G01B 5/008* (2013.01); *G01B 21/04* (2013.01)
(58) Field of Classification Search
  CPC .................................. G01B 5/20; G01B 5/008
  USPC ......................................................... 33/503
  See application file for complete search history.

(56) References Cited

U.S. PATENT DOCUMENTS

| | | | |
|---|---|---|---|
| 7,392,692 B2 | 7/2008 | Noda | |
| 7,643,963 B2 | 1/2010 | Noda et al. | |
| 2007/0271803 A1* | 11/2007 | Ishikawa | G01B 5/008 33/503 |
| 2011/0054835 A1* | 3/2011 | Takamasu | G01B 5/008 702/150 |
| 2011/0066400 A1* | 3/2011 | Noda | G01B 5/008 702/168 |
| 2012/0017453 A1* | 1/2012 | Ogihara | G01B 21/045 33/503 |
| 2013/0283627 A1* | 10/2013 | Noda | G01B 21/04 33/503 |
| 2014/0007441 A1* | 1/2014 | Pettersson | G01B 21/045 33/503 |
| 2014/0025336 A1 | 1/2014 | Noda et al. | |

(Continued)

FOREIGN PATENT DOCUMENTS

| | | |
|---|---|---|
| JP | 2005-345123 | 12/2005 |
| JP | 2008-241420 | 10/2008 |

*Primary Examiner* — G. Bradley Bennett
(74) *Attorney, Agent, or Firm* — Greenblum & Bernstein, P.L.C.

(57) ABSTRACT

Stylus head displacer displaces a stylus head on a first measurement path. A path definer defines the first measurement path. A displacement controller controls the stylus head displacer such that the stylus head displaces along the first measurement path. A position detector detects a position of the stylus head. A depression amount detector detects the depression amount of the stylus head. A measurement results memory stores the position and amount of depression of the stylus head. The depression amount detector outputs an error signal when detecting a measurement error. The displacement controller stops displacement of the stylus head in response to the error signal and displaces the stylus head to a starting point of the first measurement path, and controls the stylus head displacer such that the stylus head is displaced from the starting point to an end point of the first measurement path with a fixed depression amount.

11 Claims, 14 Drawing Sheets

(56) References Cited

U.S. PATENT DOCUMENTS

| | | | | |
|---|---|---|---|---|
| 2014/0053422 A1* | 2/2014 | Morley | ............... | G01B 5/20 33/501 |
| 2015/0052769 A1* | 2/2015 | Noda | ............... | G01B 21/047 33/503 |
| 2015/0204653 A1* | 7/2015 | Przygodda | ........ | G01B 11/005 33/503 |
| 2015/0233692 A1* | 8/2015 | Nakagawa | ............ | G01B 5/016 33/503 |
| 2015/0241194 A1* | 8/2015 | Nakagawa | ........... | G01B 21/045 702/95 |
| 2015/0300798 A1* | 10/2015 | Pettersson | ............ | G01B 21/04 33/503 |
| 2016/0018218 A1* | 1/2016 | Nakagawa | ............ | G01B 5/008 33/503 |

\* cited by examiner

FORM MEASURING APPARATUS AND FORM MEASUREMENT METHOD

CROSS-REFERENCE TO RELATED APPLICATIONS

The present application claims priority under 35 U.S.C. §119 of Japanese Application No. 2013-245155, filed on Nov. 27, 2013, the disclosure of which is expressly incorporated by reference herein in its entirety.

BACKGROUND OF THE INVENTION

1. Field of the Invention

The present invention relates to a form measuring apparatus and a form measurement method.

2. Description of Related Art

Nowadays, form measuring apparatuses measuring a surface form of an object are in widespread use. One example of such a form measuring apparatus is a form measuring apparatus measuring a form of a measured object by displacing a stylus head provided to a probe such that the stylus head scans a surface of a measured object (Japanese Patent Laid-open Publication No. 2008-241420).

This form measuring apparatus converts design values based on CAD data or the like (for example, Non-Uniform Rational B-Spline data, hereafter referred to as NURBS data) into parametric cubic curves (hereafter referred to as PCC curves). The form measuring apparatus calculates a speed curve from divided PCC curves and calculates a displacement speed of the probe based on the calculation results. In addition, the form measuring apparatus displaces the stylus head so as to scan the surface of the measured object by displacing the probe based on the calculated displacement speed. This measurement method is referred to as nominal scanning measurement (see, e.g., Japanese Patent Laid-open Publication No. 2008-241420).

Another measurement method is known for a form measuring apparatus, in which probe displacement is controlled without using design data. In this measurement method, an amount of depression of the probe toward the measured object (i.e., the distance the stylus is withdrawn into the probe when the stylus is depressed against the measured object) is detected. Then, the probe is displaced so as to scan the surface of the measured object such that the amount of depression matches a predetermined reference amount of depression. This measurement method is referred to as autonomous scanning measurement (see, e.g., Japanese Patent Laid-open Publication No. 2005-345123).

However, the inventors of the present invention have discovered an issue, discussed below, with respect to the above-noted technique. In nominal scanning measurement (Japanese Patent Laid-open Publication No. 2008-241420), the stylus head is displaced along a measurement path defined in advance based on design values. Therefore, high-speed form measurement can be carried out. However, this does not take into consideration changes in the amount of depression of the probe toward the measured object. Therefore, in a case where an indentation not present in the design exists on the surface of the measured object, when the stylus head displaces over the unexpected indentation, the amount of depression of the stylus head drops (i.e., the distance the stylus withdraws into the probe when the stylus head contacts the measured object is reduced). Further, in a case where a projection not present in the design exists on the surface of the measured object, when the stylus head displaces over the unexpected projection, the amount of depression of the stylus head increases (i.e., the distance the stylus withdraws into the probe when the stylus head contacts the measured object is increased). As a result, when the amount of depression of the stylus head exceeds an allowed range, measurement data cannot be obtained and form measurement is interrupted.

The present invention was conceived in light of the circumstances above, and when performing form measurement with a form measuring apparatus, the present invention continues the form measurement even in a case where a measurement error occurs in which an amount of depression of a stylus head exceeds an allowed range.

SUMMARY OF THE INVENTION

One aspect of the present invention is a form measuring apparatus that includes a probe having a stylus head provided to a forefront end thereof; a stylus head displacer displacing the stylus head on a first measurement path scanning a surface of a measured object; a path definer defining the first measurement path based on design information for the measured object; a displacement controller obtaining the first measurement path from the path definer and controlling the stylus head displacer such that the stylus head displaces along the first measurement path; a position detector detecting a position of the stylus head on the first measurement path; a depression amount detector detecting an amount of depression of the stylus head toward the measured object on the first measurement path; and a measurement results memory storing the detected position and amount of depression of the stylus head as measurement results. The depression amount detector outputs an error signal when a measurement error occurs in which the amount of depression of the stylus head exceeds an allowed range. The displacement controller controls the stylus head displacer such that displacement of the stylus head is stopped in response to the error signal, the stylus head is displaced to a starting point of the first measurement path, and the stylus head is displaced from the starting point to an end point of the first measurement path while scanning the surface of the measured object with a fixed amount of depression of the stylus head toward the measured object.

Another aspect of the present invention is the form measuring apparatus described above, in which the path definer obtains from the measurement results memory measurement results stored by displacing the stylus head from the starting point to the end point of the first measurement path while scanning the surface of the measured object with a fixed amount of depression of the stylus head toward the measured object; generates a second measurement path based on the obtained measurement results; and updates the first measurement path with the second measurement path.

Another aspect of the present invention is the form measuring apparatus described above in which, in a case where a plurality of connected first measurement paths are present, the displacement controller detects the measurement error for each of the connected plurality of first measurement paths.

Another aspect of the present invention is the form measuring apparatus described above further including an error flag memory storing an error flag, the error flag indicating a first measurement path from among the connected plurality of first measurement paths where a measurement error was detected. The depression amount detector writes the error flag to the error flag memory for each of the connected plurality of first measurement paths in a case where a measurement error was detected. The path definer references the error flag and detects the first measurement path from among the connected plurality of first measurement paths where a measurement error was detected and, for all first measurement paths where a measurement error was detected, obtains from the measurement results memory measurement results stored by displacing the stylus head from the starting point to the end point while scanning the surface of the measured object with a fixed amount of depression of the stylus head toward the measured object; generates a second measurement path based on the obtained measurement results; and updates the first measurement path with the second measurement path.

Another aspect of the present invention is the form measuring apparatus described above, in which the displacement controller, in a case where the error signal is output from the depression amount detector, defines an arbitrary point on the first measurement path between the starting point and the end point of the first measurement path and displaces the stylus head within a plane occupied by the starting point, the end point, and the arbitrary point of the first measurement path.

Another aspect of the present invention is the form measuring apparatus described above, in which the displacement controller, in a case where the starting point of the first measurement path, the end point, and the arbitrary point are aligned on a straight line, defines a point of intersection between the first measurement path and a line orthogonal to an intermediate point on the straight line linking the starting point and the end point of the first measurement path, and displaces the stylus head within a plane occupied by the starting point, the end point, and the point of intersection of the first measurement path.

Another aspect of the present invention is the form measuring apparatus described above, in which the displacement controller, in a case where the starting point of the first measurement path, the end point, and the arbitrary point are aligned on a straight line, defines three points of intersection between the first measurement path and three lines orthogonal to quadrisection points on the straight line linking the starting point and the end point of the first measurement path, and displaces the stylus head within a plane occupied by the starting point, the end point, and any one of the three points of intersection of the first measurement path.

Another aspect of the present invention is a form measurement method for the form measuring apparatus described above, the method obtaining a measurement path defined based on design information for a measured object, the measurement path scanning a surface of the measured object on which a stylus head provided to a forefront end of a probe is displaced; displacing the stylus head along the measurement path; detecting a position of the stylus head on the measurement path; detecting an amount of depression of the stylus head toward the measured object on the measurement path; obtaining as measurement results the detected position and amount of depression of the stylus head; and, in a case where the amount of displacement of the stylus head exceeds an allowed range, stopping displacement of the stylus head, displacing the stylus head to a starting point of the measurement path, and displacing the stylus head from the starting point to an end point of the measurement path while scanning the surface of the measured object with a fixed amount of depression of the stylus head toward the measured object.

According to the present invention, when performing form measurement with a form measuring apparatus, the form measurement continues even in a case where a measurement error occurs in which an amount of depression of a stylus head exceeds an allowed range.

The present invention is clarified by the following detailed description and the appended drawings. The appended drawings are referenced only to facilitate understanding and do not serve to limit the present invention.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
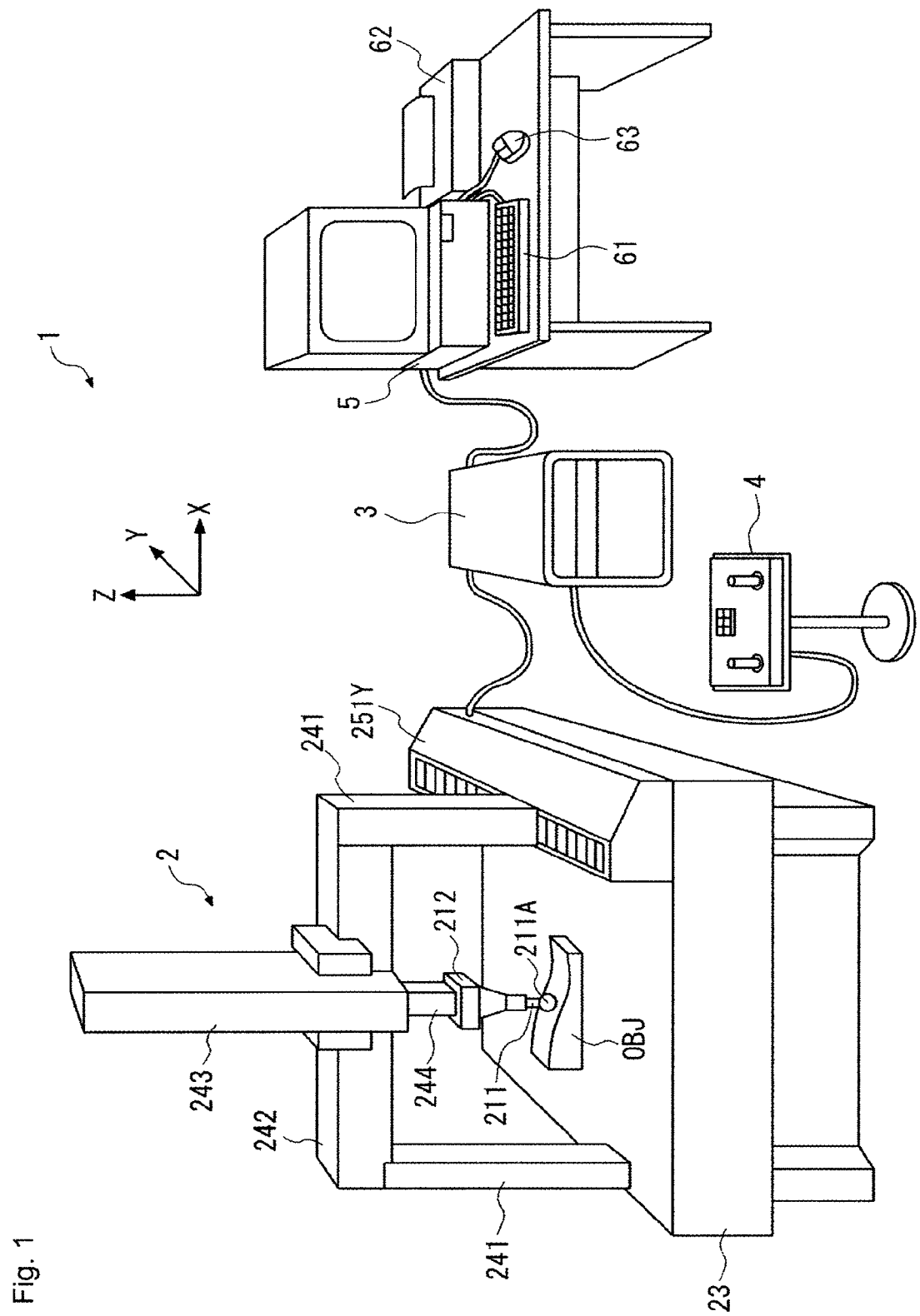
FIG. 1 is an overall view schematically illustrating a configuration of a coordinate measuring machine 1 according to a first embodiment.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, embodiments of the present invention are described with reference to the drawings. Identical reference numerals are assigned to identical elements in each of the plurality of drawings, and duplicative descriptions are omitted where necessary.

First Embodiment

Figure 2:
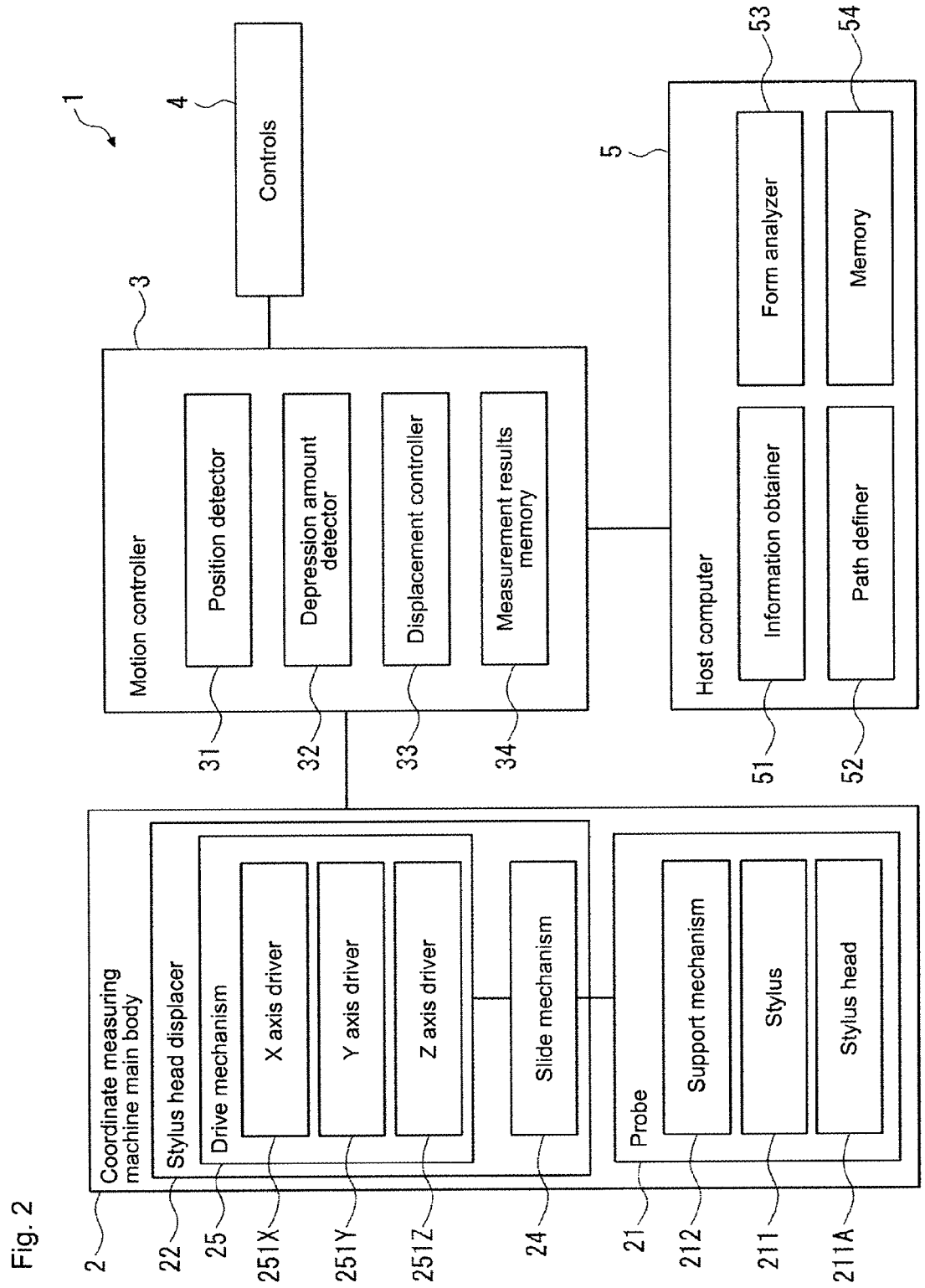
FIG. 2 is a schematic block diagram illustrating the configuration of the coordinate measuring machine 1 according to the first embodiment.
Figure 3:
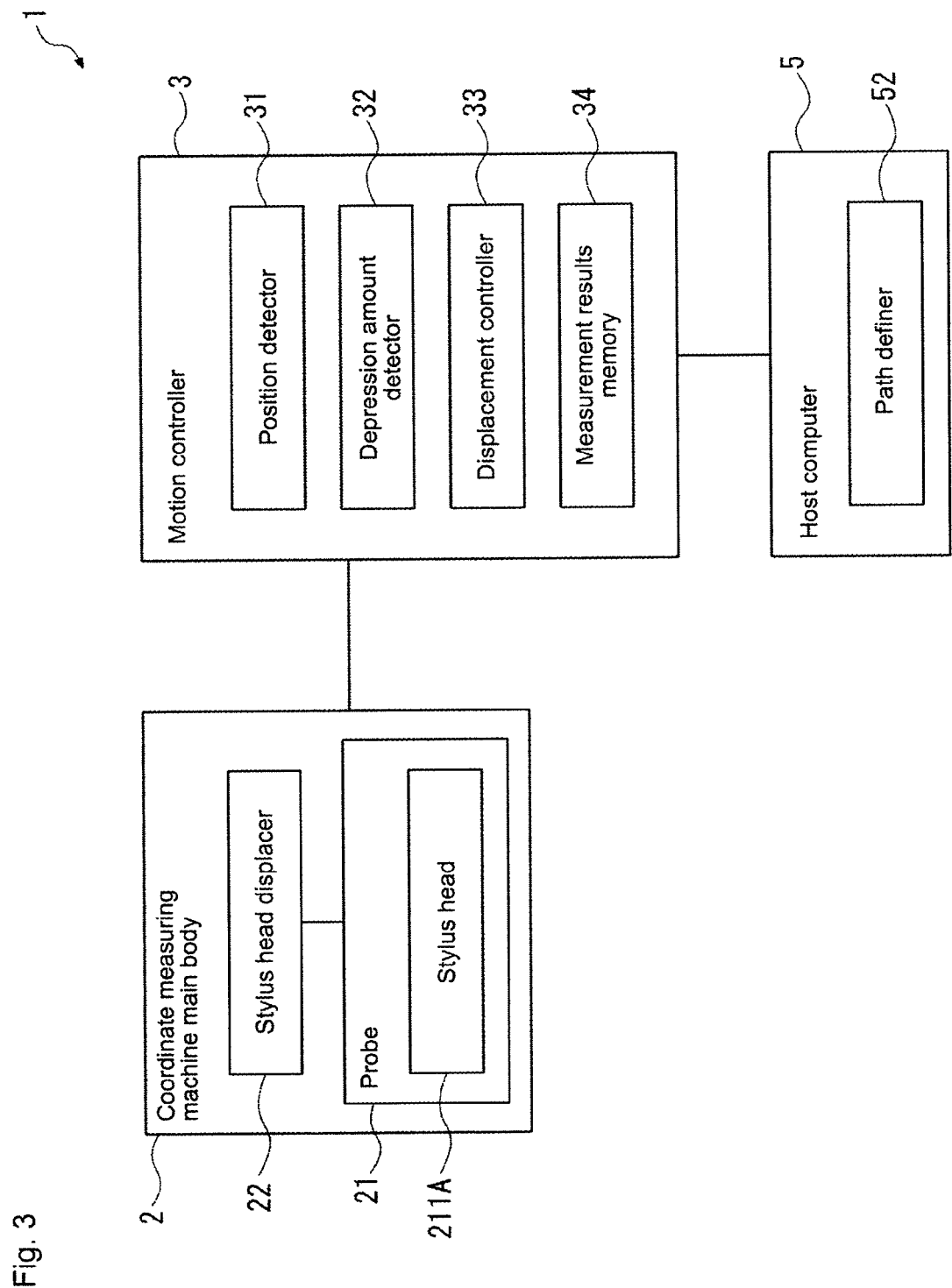
FIG. 3 is a block diagram illustrating a basic configuration of the coordinate measuring machine 1 according to the first embodiment.

Hereafter, a description is given of a coordinate measuring machine, which is exemplary of a form measuring apparatus. FIG. 1 is an overall view schematically illustrating a configuration of a coordinate measuring machine 1 according to a first embodiment. FIG. 2 is a schematic block diagram illustrating the configuration of the coordinate measuring machine 1 according to the first embodiment. FIG. 3 is a block diagram illustrating a basic configuration of the coordinate measuring machine 1 according to the first embodiment. The description is given with an up direction in FIG. 1 as a +Z axis direction and with two axes orthogonal to the Z axis as an X axis and a Y axis, respectively. A machine coordinate system is defined by the X, Y, and Z axis directions. The same system is used in subsequent figures.

As shown in FIGS. 1 and 2, the coordinate measuring machine 1 includes a coordinate measuring machine main body 2, a motion controller 3, controls 4, and a host computer 5.

(Configuration of Coordinate Measuring Machine Main Body 2)

As shown in FIG. 1, the coordinate measuring machine main body 2 includes a probe 21, a stylus head displacer 22, and a stage 23. The probe 21 includes a stylus head 211A, a stylus 211, and a support mechanism 212. The stylus head 211A is provided to a forefront (or distal) end (−Z axis direction) of the stylus 211.

The support mechanism 212 supports the base end (+Z axis direction) of the stylus 211. The support mechanism 212 supports the stylus 211 so as to position the stylus 211 in a predetermined position by biasing the stylus 211 in each of the X, Y, and Z axis directions. Also, when an outside force is applied (i.e., when the stylus head 211A is in direct contact with a measured object OBJ), the support mechanism 212 is capable of displacing the stylus 211 within a fixed range in each of the X, Y, and Z axis directions. Although not specifically depicted in the drawings, the support mechanism 212 includes probe sensors for detecting a position of the stylus 211 in each of the axis directions. Each probe sensor is a position sensor outputting a pulse signal corresponding to an amount of displacement of the stylus 211 in each axis direction.

The stylus head displacer 22 holds and also displaces the probe 21. The stylus head displacer 22 is upright on the stage 23. As shown in FIGS. 1 and 2, the stylus head displacer 22 includes a slide mechanism 24 and a drive mechanism 25.

The slide mechanism 24 holds the probe 21 and is also capable of slide-displacing the probe 21. The slide mechanism 24 is configured by two columns 241, a beam 242, a slider 243, and a ram 244. The two columns 241 extend in a +Z axis direction from both X-axis-direction ends of the stage 23, and are provided so as to be capable of slide-displacement along the Y axis direction. The beam 242 is supported by the two columns 241 and extends along the X axis direction. The slider 243 is formed in a cylindrical shape extending along the Z axis direction and is provided so as to be capable of slide-displacement over the beam 242 along the X axis direction. The ram 244 is inserted into an interior of the slider 243 and is provided so as to be capable of slide-displacement through the interior of the slider 243 along the Z axis direction.

The drive mechanism 25 displaces the probe 21 by driving the slide mechanism 24. The drive mechanism 25 includes an X axis driver 251X, a Y axis driver 251Y, and a Z axis driver 251Z. The X axis driver 251X slides over the beam 242 and displaces the slider 243 along the X axis direction. The Y axis driver 251Y supports the +X axis direction column 241 and slide-displaces the column 241 along the Y axis direction. The Z axis driver 251Z slides through the interior of the slider 243 and displaces the ram 244 along the Z axis direction. Although not specifically depicted in the drawings, scale sensors are provided to each of the X axis driver 251X, the Y axis direction driver 251Y, and the Z axis driver 251Z, the scale sensors detecting the position of the columns 241, the slider 243, and the ram 244 in each axis direction. Each scale sensor is a position sensor outputting a pulse signal corresponding to an amount of displacement of the columns 241, the slider 243, and the ram 244.

(Configuration of Motion Controller 3)

As shown in FIG. 2, the motion controller 3 includes a position detector 31, a depression amount detector 32, a displacement controller 33, and a measurement result memory 34.

The position detector 31 counts the pulse signals output from the above-noted scale sensors to measure an amount of displacement of the slide mechanism 24; in addition, the position detector 31 counts the pulse signals output from the above-noted probe sensors to measure an amount of displacement of the stylus 211. The position detector 31 calculates a position PP of the stylus head 211A (hereafter, probe position PP) based on the measured amounts of displacement of each of the slide mechanism 24 and the stylus 211.

The depression amount detector 32 can calculate an absolute value of a depression amount Ep of the stylus head 211A based on the amount of displacement of the stylus 211 measured by the position detector 31 (detected values for each probe sensor (Px, Py, Pz)), as shown in Formula 1 below.

[Formula 1]

$$|\vec{Ep}| = \sqrt{Px^2 + Py^2 + Pz^2} \qquad (1)$$

The displacement controller 33 obtains, from the host computer 5, a measurement path (also referred to as a first measurement path) for driving the probe 21. The measurement path obtained is described by a PCC command (PCC data). Based on the probe position PP calculated by the position detector 31, the depression amount, and the obtained PCC data, the displacement controller 33 calculates a probe command value (speed vector) for displacing the stylus head 211A to scan a surface of the measured object OBJ in a state where the stylus head 211A is depressed toward the measured object OBJ. The displacement controller 33 controls operations of the probe 21 by outputting the probe command value to the drive mechanism 25.

In a case where nominal scanning measurement is performed, the displacement controller 33 calculates a speed component vector (speed vector) along the path of probe 21 based on the PCC command (PCC data) indicating the measurement path, and outputs the calculated result to the drive mechanism 25 as the probe command value. In other words, the displacement controller 33 displaces the probe 21 by controlling the stylus head displacer 26 using the probe command value.

In a case where autonomous scanning measurement is performed, the displacement controller 33 displaces the probe 21 such that the amount of depression calculated by the depression amount detector 32 is fixed, as previously described in Japanese Patent Laid-open Publication No. 2005-345123, for example.

The measurement result memory 34 stores form measurement results, represented by the position of the stylus head 211A detected by the position detector 31 and the amount of depression detected by the depression amount detector 32.

(Configuration of Controls 4)

The controls 4 are configured by a joystick or a variety of switches, for example. The controls 4 are provided as a man/machine interface between the coordinate measuring machine 1 and the user operating the coordinate measuring machine 1. The user operating the coordinate measuring machine 1 is able to issue commands to the coordinate measuring machine 1, the coordinate measuring machine main body 2, the motion controller 3, and the host computer 5 via the controls 4.

(Configuration of the Host Computer 5)

The host computer 5 is configured to include a CPU (Central Processing Unit) and memory, for example, and controls the coordinate measuring machine main body 2 by issuing a predetermined command to the motion controller 3. As shown in FIG. 2, the host computer 5 includes an information obtainer 51, a path definer 52, a form analyzer 53, and a memory 54. The information obtainer 51 obtains design information (CAD data, NURBS data, or the like) of the measured object OBJ from a CAD system (not shown in the drawings). The path definer 52 defines the path (PCC data) along which the probe 21 is displaced based on the design information obtained by the information obtainer 51. The form analyzer 53 performs form analysis in which surface shape data of the measured object is calculated based on measurement data output from the motion controller 3 and errors, distortion, and the like in the calculated surface shape data of the measured object are found. The memory 54 stores data used by the host computer 5, the design information related to the form of the measured object OBJ, and the like. An input device such as a keyboard 61 and mouse 63 and an output device such as a printer 62 are connected to the host computer 5 as peripheral devices.

Figure 4:
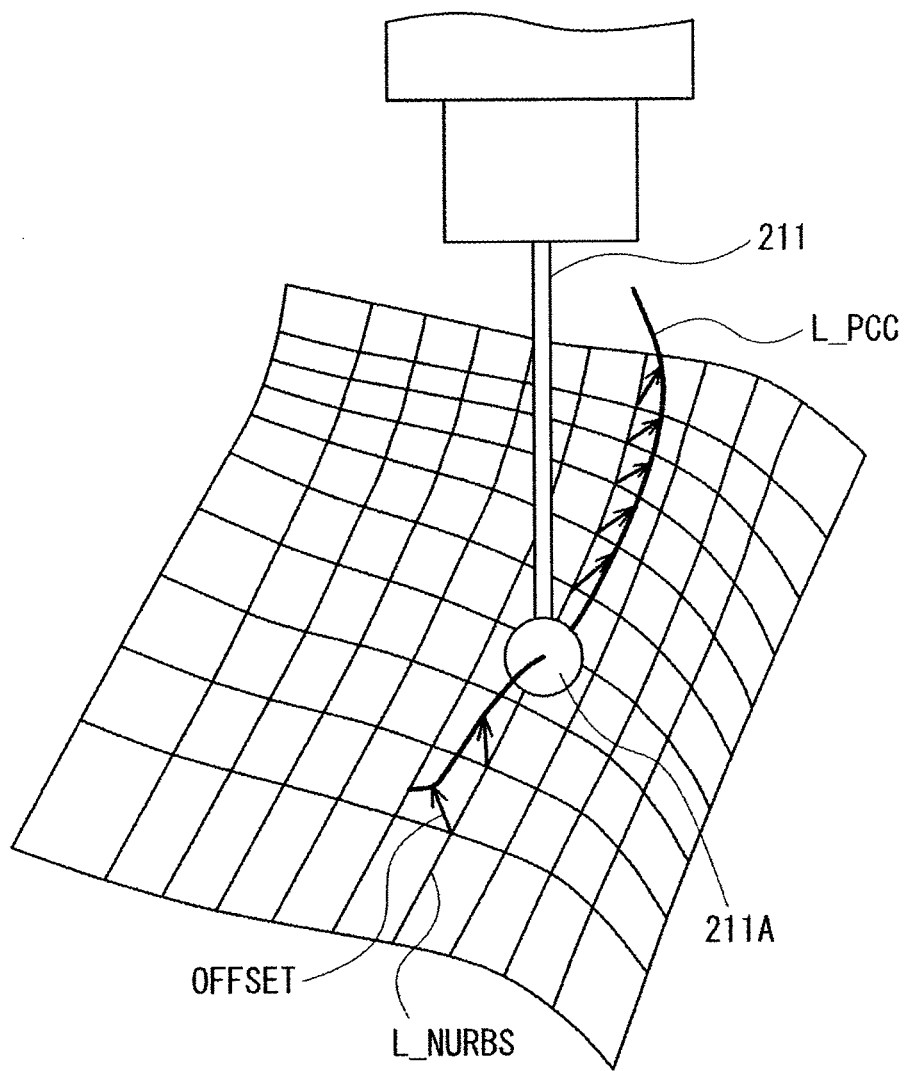
FIG. 4 illustrates a relationship between a NURBS curve and a PCC curve.

Next, the PCC curve is described. FIG. 4 illustrates a relationship between a NURBS curve and the PCC curve. As shown in FIG. 4, using NURBS data (which includes parameters and coordinate values of control points), the form of the measured object OBJ can be represented with a NURBS curve and a NURBS curved surface. Moreover, even a straight line or flat surface can be represented using the NURBS data; therefore, an overall form of the measured object OBJ can be collectively represented using the NURBS data. Accordingly, path information for displacement of the stylus head 211A that includes a curved line, arc, or straight line can be collectively represented using the NURBS data, and a PCC curve can be generated based on the NURBS data. A PCC curve L_PCC serving as path information offsets a NURBS curve L_NURBS in a normal direction (direction of a normal vector) thereof. Here, an offset amount OFFSET is a value obtained by subtracting a reference depression amount from a radius of the stylus head 211A. The CPU 41 executes control such that a center of the stylus head 211A ball transits along the PCC curve.

Figure 5:
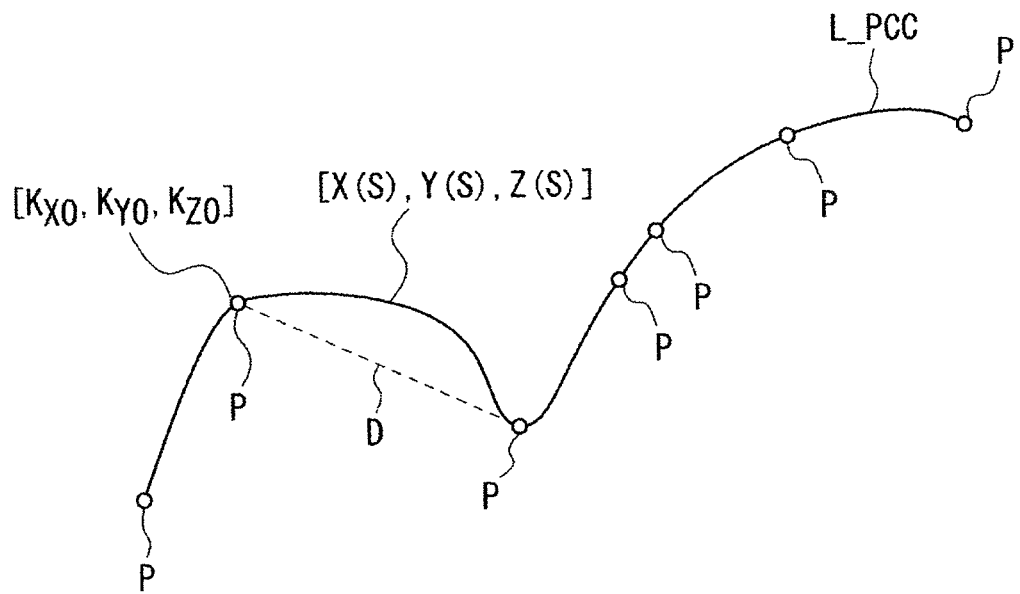
FIG. 5 schematically illustrates a configuration of the PCC curve.

FIG. 5 schematically illustrates a configuration of the PCC curve. As shown in FIG. 5, the PCC curve L_PCC is divided into a plurality of segments by points P. Accordingly, each segment is also configured by a PCC curve. An end point of each segment is a starting point of the subsequent segment (PCC curve). Here, coordinates of the starting point of any PCC curve are defined as $(K_{X0}, K_{Y0}, K_{Z0})$, and a length of a straight line between the starting point and end point on the PCC curve is defined as D. When so defined, coordinates at a desired position on the PCC curve $\{X(S), Y(S), Z(S)\}$ are expressed by Formula 2, shown below.

[Formula 2]

$$X(S) = K_{X1}S^3 + K_{X2}S^2 + K_{X1}S + K_{X0}$$

$$Y(S) = K_{Y1}S^3 + K_{Y2}S^2 + K_{Y1}S + K_{Y0}$$

$$Z(S) = K_{Z1}S^3 + K_{Z2}S^2 + K_{Z1}S + K_{Z0}$$

$$S[0,D] \tag{2}$$

Figure 6:
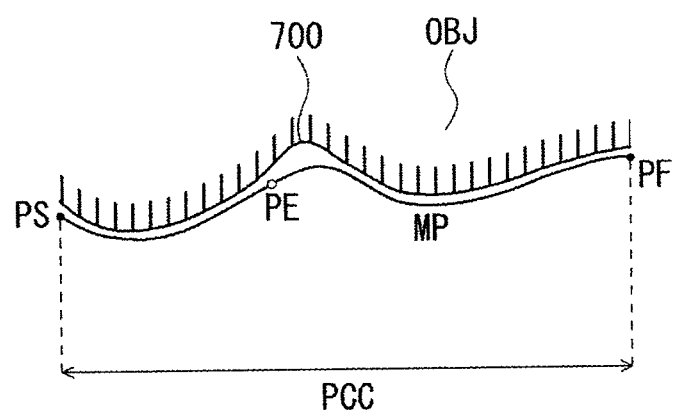
FIG. 6 illustrates one PCC curve segment PCC indicating a path of a nominal scanning measurement in the coordinate measuring machine 1.

Next, form measurement operations of the coordinate measuring machine 1 are described. FIG. 6 illustrates one PCC curve segment PCC indicating a path of a nominal scanning measurement in the coordinate measuring machine 1. In FIG. 6, the starting point of the PCC curve segment PCC is defined as PS and the end point is defined as PF.

In FIG. 6, the measured object OBJ of the nominal scanning measurement is positioned upward on the drawing sheet. The coordinate measuring machine 1 drives the probe 21 such that the center of the stylus head 211A of the probe is positioned over a measurement path MP defined by the PCC curve. At this point, an indentation 700 may exist due to a manufacturing error in the measured object OBJ, for example. In a case where an indentation amount of the indentation 700 is large, the amount of depression of the stylus head 211A may exceed an allowed range when the stylus head 211A is directed at the indentation 700, leading to a situation where the stylus head 211A does not track deviation in the surface of the measured object OBJ and separates from the surface of the measured object OBJ. Similarly, a projection may exist due to a manufacturing error in the measured object OBJ, for example. In a case where a projection amount of the projection is large, the amount of depression of the stylus head 211A may exceed an allowed range when the stylus head 211A is directed at the projection, leading to a situation where the stylus head 211A does not track deviation in the surface of the measured object OBJ. Hereafter, a situation where the stylus head 211A is unable to fully track the deviation of the surface of the measured object OBJ is referred to as a measurement error. A point on the PCC curve at which a situation is detected where the stylus head 211A is unable to fully track the deviation of the surface of the measured object OBJ is referred to as an error origination point PE. When a measurement error occurs, data indicating the surface shape of the measured object OBJ cannot be obtained and therefore measurement is interrupted. Moreover, the allowed range of the amount of depression of the stylus head is restricted to, for example, a detection range of a sensor detecting the amount of depression or a range in which the probe can physically move.

Figure 7:
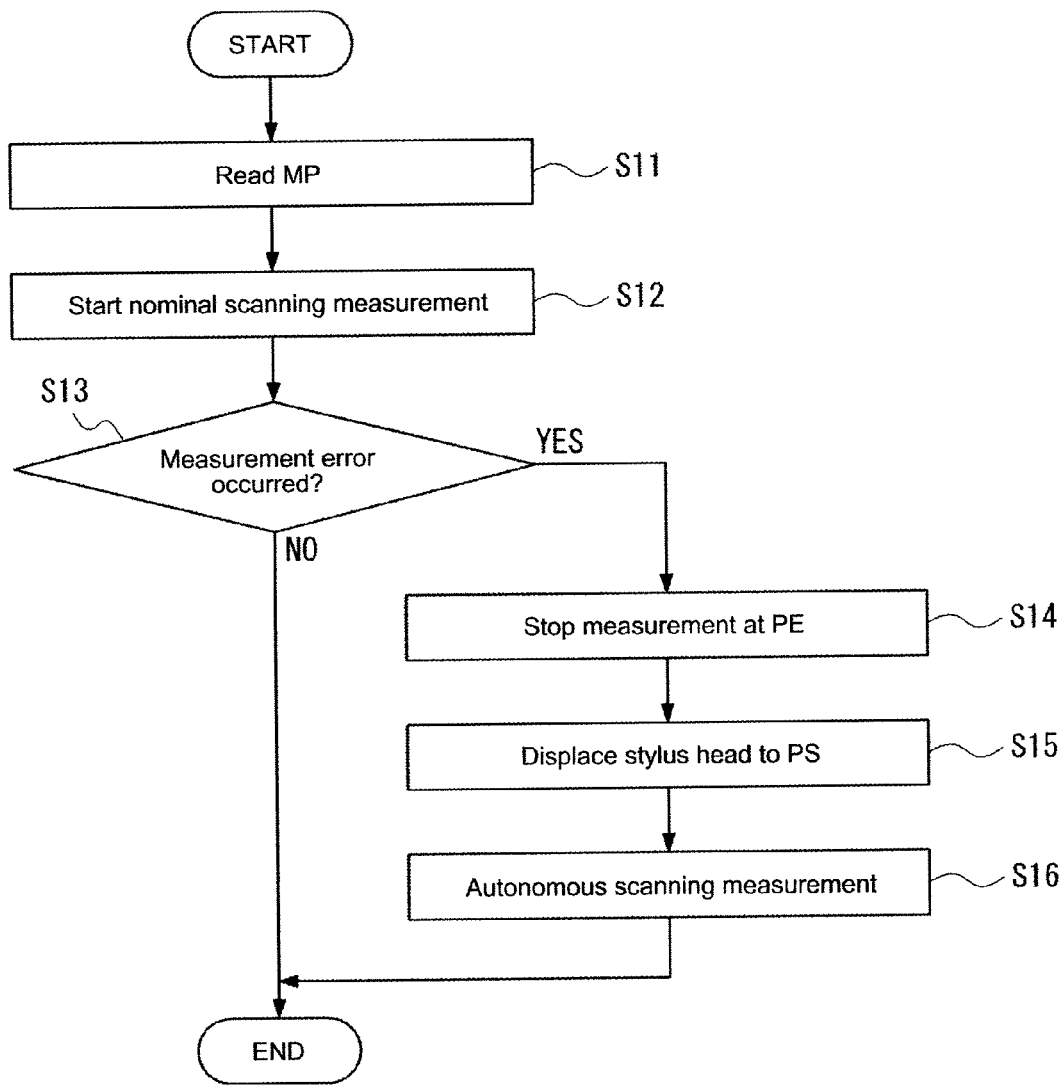
FIG. 7 is a flow chart illustrating a form measurement method of the coordinate measuring machine 1 according to the first embodiment.

The coordinate measuring machine 1 according to the present embodiment is capable of executing a measurement method that continues the measurement even when a measurement error has occurred. Below, a form measurement method of the coordinate measuring machine 1 is described. FIG. 7 is a flow chart illustrating a form measurement method of the coordinate measuring machine 1 according to the first embodiment.

(Step S11)

In order to perform nominal scanning measurement, the displacement controller 33 reads a nominal scanning measurement path MP (first measurement path) of the PCC curve segment PCC from the path definer 52.

(Step S12)

The nominal scanning measurement from the starting point PS to the end point PF of the PCC curve segment PCC is initiated. The displacement controller 33 displaces the stylus head 211A from the starting point PS to the end point PF of the PCC curve segment PCC, along the measurement-path MP. During the nominal scanning measurement, the position detector 31 detects the position of the stylus head 211A, while the depression amount detector 32 detects the amount of depression of the stylus head 211A toward the measured object OBJ (i.e., the depression amount detector 32 detects the distance the stylus 211 is withdrawn into the support mechanism 212 in the Z axis direction when the stylus head 211A is depressed against the measured object OBJ).

(Step S13)

During the nominal scanning measurement from the starting point PS to the end point PF of the PCC curve segment PCC, the depression amount detector 32 monitors the amount of depression of the stylus head 211A toward the measured object OBJ. At this point, in a case where the amount of depression of the stylus head 211A toward the measured object OBJ exceeds an allowed range, the stylus head 211A cannot be depressed toward the measured object OBJ in excess of the allowed range. Therefore, the stylus head 211A is unable to fully track the deviation of the surface of the measured object OBJ. Accordingly, the depression amount detector 32 registers that the amount of depression of the stylus head 211A toward the measured object OBJ has exceeded the allowed range and detects this as a measurement error. Moreover, in a case where no measurement error is detected, the form measurement ends. Measurement results are stored in the measurement result memory 34.

(Step S14)

In a case where the depression amount detector 32 detects a measurement error during the nominal scanning measurement from the starting point PS to the end point PF of the PCC curve segment PCC, the displacement controller 33 stops displacement of the stylus head 211A at the error origination point PE. The position detector 31 stores the error origination point PE.

(Step S15)

The displacement controller 33 drives the probe 21 and displaces the stylus head 211A from the error origination point PE to the starting point PS of the PCC curve segment PCC. At this point, the displacement controller 33 displaces the stylus head 211A along the measurement path of the nominal scanning measurement.

(Step S16)

The autonomous scanning measurement from the starting point PS to the end point PF of the PCC curve segment PCC is initiated. The displacement controller 33 displaces the stylus head 211A from the starting point PS to the end point PF of the PCC curve segment PCC, such that the amount of depression of the stylus head 211A toward the measured object OBJ is fixed. During the autonomous scanning measurement, the position detector 31 detects the position of the stylus head 211A, while the depression amount detector 32 detects the amount of depression of the stylus head 211A toward the measured object OBJ.

During the autonomous scanning measurement, the probe 21 requires the stylus head 211A to be displaced within a confining plane such that the deviation from the surface of the measured object OBJ is fixed. In the present embodiment, a plane occupied by the starting point PS and end point PF of the PCC curve segment PCC and also occupied by the error origination point PE is defined as the confining plane.

Figure 8:
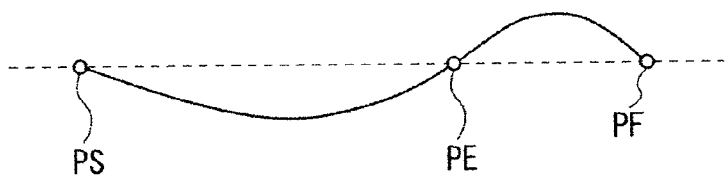
FIG. 8 illustrates a case where a starting point PS and an end point PF of the PCC curve segment PCC and an error origination point PE are aligned on a straight line.

Moreover, in a case where the starting point PS and the end point PF of the PCC curve segment PCC as well as the error origination point PE are aligned on a straight line, the plane occupied by the starting point PS and end point PF of the PCC curve segment PCC and also occupied by the error origination point PE is not uniquely defined. FIG. 8 illustrates a case where the starting point PS and the end point PF of the PCC curve segment PCC as well as the error origination point PE are aligned on a straight line.

In such a case, instead of the error origination point PE, an arbitrary point PA is defined that is between the starting point PS and the end point PF of the PCC curve segment PCC and that is not aligned on the straight line relative to the starting point PS and the end point PF of the PCC curve segment PCC. In addition, the plane occupied by the starting point PS and end point PF of the PCC curve segment PCC and also occupied by the defined point PA is treated as the confining plane. The displacement controller 33 calculates the confining plane of the probe 21 per the above description.

Figure 9:
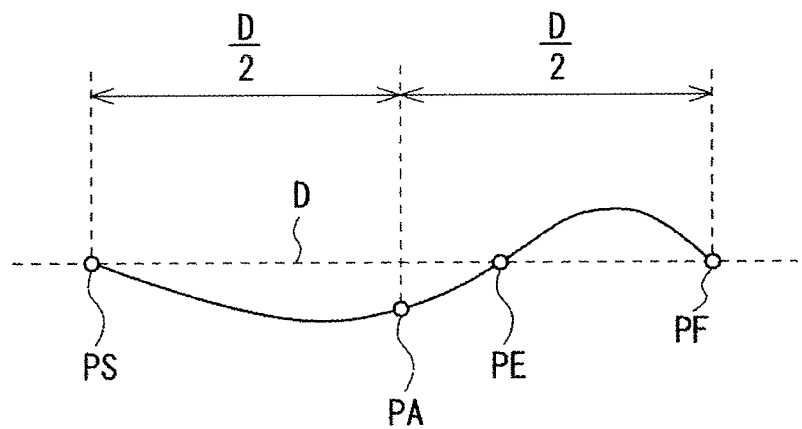
FIG. 9 illustrates a case where a point designated as a point PA is a point on the PCC curve corresponding to an intermediate point on the straight line between the starting point PS and the end point PF of the PCC curve segment PCC.

For example, the length of the straight line between the starting point PS and end point PF on the PCC curve segment PCC is defined as D, and a point corresponding to an intermediate point on the straight line is defined as PA. FIG. 9 illustrates a case where a point designated as the point PA is a point on the PCC curve corresponding to an intermediate point on the straight line between the starting point PS and the end point PF of the PCC curve segment PCC. The point PA is a point of intersection between the measurement path MP and a line orthogonal at an intermediate point to the straight line between the starting point PS and the end point PF.

Figure 10:
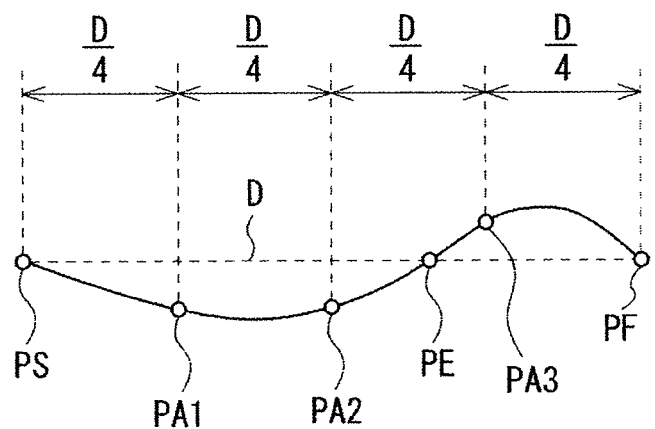
FIG. 10 illustrates a case where a point designated as a point PA is a point on the PCC curve corresponding to a quadrisection point of the straight line between the starting point PS and the end point PF of the PCC curve segment PCC.

Further, for example, the length of the straight line between the starting point PS and end point PF on the PCC curve segment PCC is defined as D, and any one of points PA1 to PA3 corresponding to quadrisection points of the straight line is defined as PA. FIG. 10 illustrates a case where a point designated as the point PA is a point on the PCC curve corresponding to a quadrisection point of the straight line between the starting point PS and the end point PF of the PCC curve segment PCC. The points PA1 to PA3 are three points of intersection between the measurement path MP and three lines orthogonal at the quadrisection points to the straight line between the starting point PS and the end point PF.

When the autonomous scanning measurement is completed in step S16, the form measurement ends. Measurement results are stored in the measurement result memory 34.

As described above, first the coordinate measuring machine 1 initiates the nominal scanning measurement in order to perform high-speed form measurement. During the nominal scanning measurement, in a case where the stylus head displaced along the measurement path is unable to fully track the deviation of the surface of the measured object due to, e.g., an indentation on the measured object, a measurement error is detected. Then, when the measurement error is detected, the measurement method switches to autonomous scanning measurement and form measurement of the segment where the measurement error occurred is resumed. Accordingly, the coordinate measuring machine 1 can continue form measurement without interruption even in a case where a measurement error occurs.

Moreover, in the autonomous scanning measurement, the confining plane is calculated as noted above; therefore, the measurement path of the autonomous scanning measurement differs from that of the nominal scanning measurement. However, measurement results can be obtained that, overall, closely resemble the measurement results of the nominal scanning measurement.

Second Embodiment

Next, a description is given of a coordinate measuring machine 6 according to a second embodiment. The coordinate measuring machine 6 is a modification of the coordinate measuring machine 1 according to the first embodiment. In a case where a measurement error is detected and the autonomous scanning measurement is performed, the coordinate measuring machine 6 is capable of re-defining the measurement path of the nominal scanning measurement based on the results of the autonomous scanning measurement. Other configurations of the coordinate measuring machine 6 are similar to those of the coordinate measuring machine 1 and descriptions thereof are therefore omitted.

Figure 11:
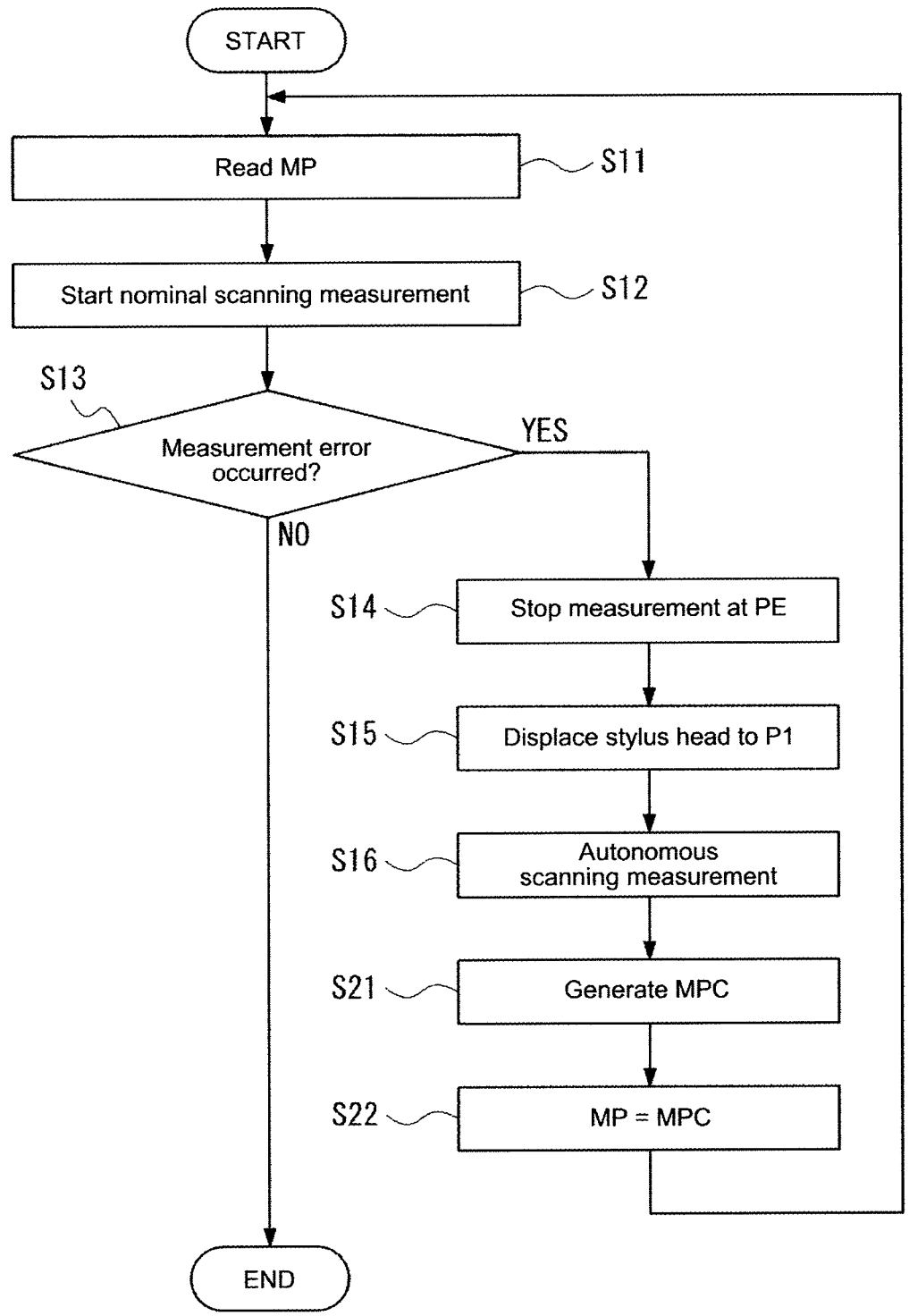
FIG. 11 is a flow chart illustrating a form measurement method of a coordinate measuring machine 6 according to a second embodiment.

Next, form measurement operations of the coordinate measuring machine 6 are described. FIG. 11 is a flow chart illustrating a form measurement method of the coordinate measuring machine 6 according to the second embodiment. FIG. 11 depicts a procedure to which steps S21 and S22 have been added after step S16 (shown in FIG. 7). Steps S11 to S16 are similar to those of the coordinate measuring machine 1 (see FIG. 7) and descriptions thereof are therefore omitted. Hereafter, steps S21 and S22 are described.

(Step S21)

The path definer 52 obtains the results of the autonomous scanning measurement from the motion controller 3. Based on the obtained results of the autonomous scanning measurement, the path definer 52 generates a new nominal scanning measurement path MPC (second measurement path) of the PCC curve segment PCC.

(Step S22)

The path definer 52 updates the existing nominal scanning measurement path MP of the PCC curve segment PCC using the newly generated nominal scanning measurement path MPC of the PCC curve segment PCC (MP=MPC). Thereafter, the process returns to step S11.

Above, in a case where a measurement error is detected and the autonomous scanning measurement is performed, the coordinate measuring machine 6 according to the present embodiment is capable of updating the measurement path of the nominal scanning measurement based on the results of the autonomous scanning measurement. As a result, even when a situation arises in which the deviation of the surface of the measured object cannot be fully tracked in the vicinity of the error origination point PE, by performing the nominal scanning measurement along the updated measurement path, interruption of the measurement due to the occurrence of an error in the nominal scanning measurement can be inhibited.

Third Embodiment

Next, a description is given of a coordinate measuring machine 7 according to a third embodiment. The coordinate measuring machine 7 is a modification of the coordinate measuring machine 1 according to the first embodiment. The coordinate measuring machine 7 can perform the form measurement described in the first embodiment using a plurality of connected PCC curve segments.

Figure 12:
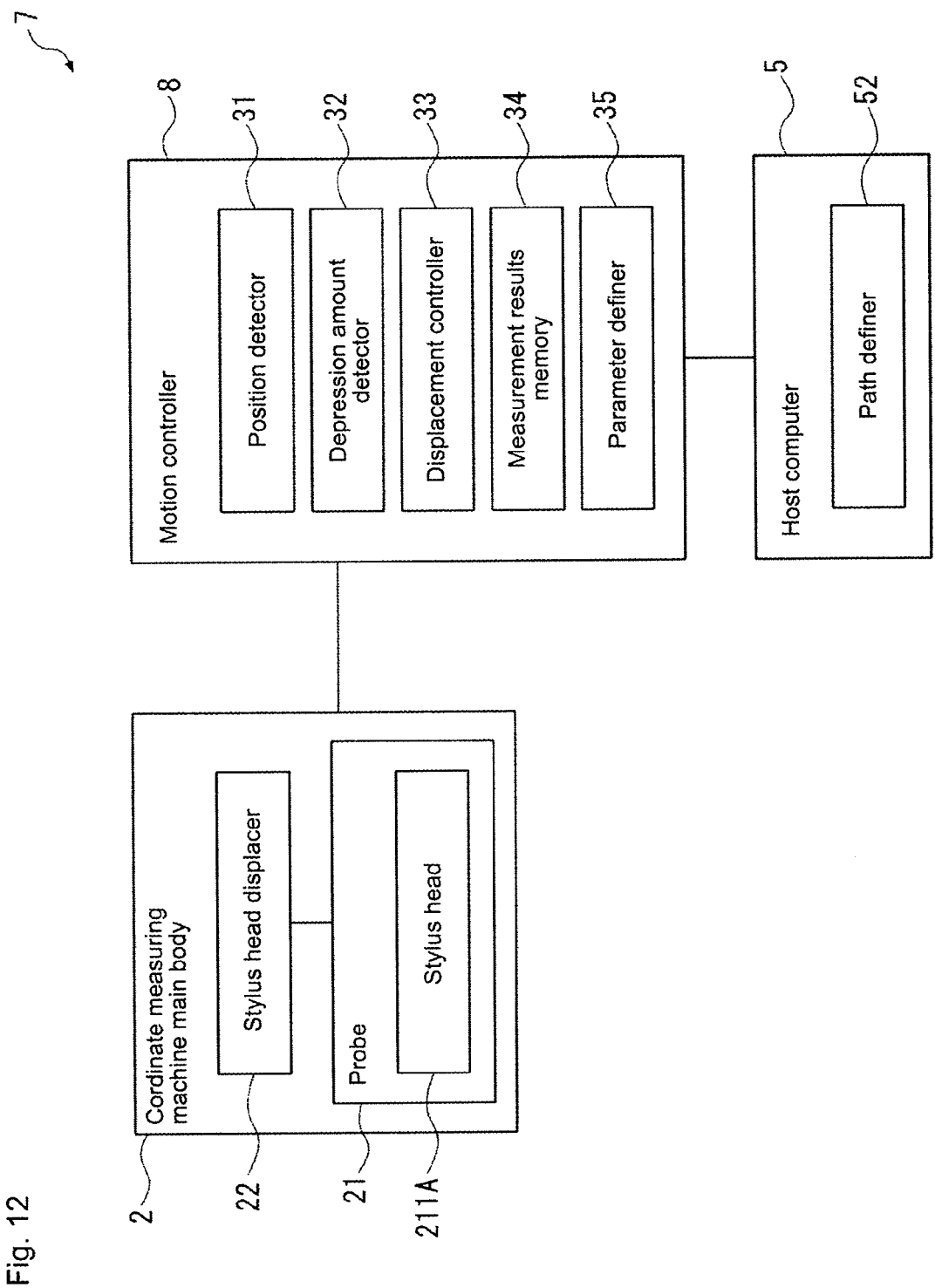
FIG. 12 is a block diagram illustrating a basic configuration of a coordinate measuring machine 7 according to a third embodiment.

FIG. 12 is a block diagram illustrating a basic configuration of the coordinate measuring machine 7 according to the third embodiment. The coordinate measuring machine 7 replaces the motion controller 3 of the coordinate measuring machine 1 with a motion controller 8. The motion controller 8 adds a parameter definer 35 to the configuration of the motion controller 3 of the coordinate measuring machine 1. Other configurations of the coordinate measuring machine 7 are similar to those of the coordinate measuring machine 1 and descriptions thereof are therefore omitted.

The parameter definer 35 can define and recognize a parameter i, which indicates a number for the plurality of PCC curve segments configuring the measurement path. i is an integer equal to or greater than 2.

Figure 13:
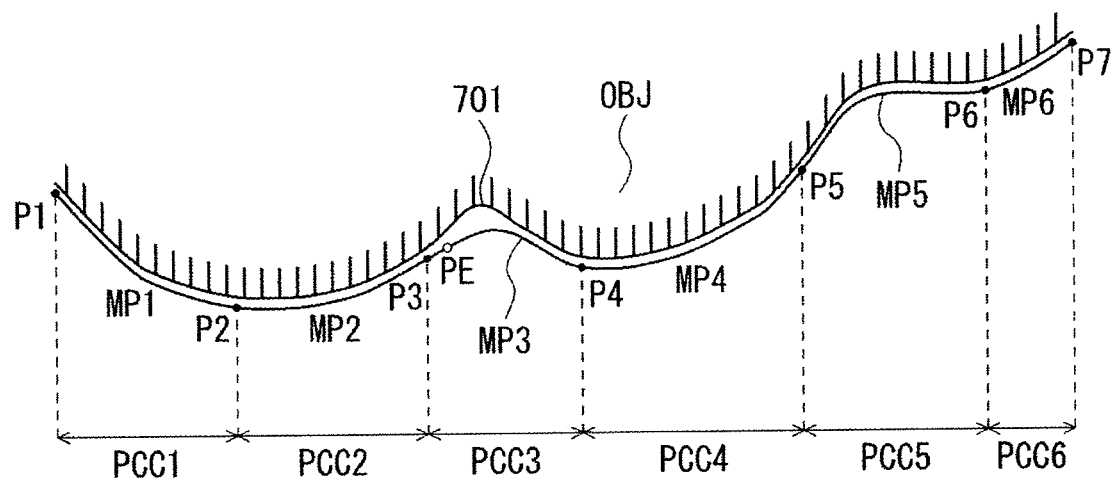
FIG. 13 schematically illustrates a configuration of a PCC curve segment indicating an exemplary path of a nominal scanning measurement in the coordinate measuring machine 7.

First, nominal scanning measurement of the coordinate measuring machine 7 is described. FIG. 13 schematically illustrates a PCC curve segment configuration depicting an exemplary path of a nominal scanning measurement in the coordinate measuring machine 7. In the example shown in FIG. 13, the measurement path is divided into six PCC curve segments PCC1 to PCC6 between point P1 and point P7. The measurement paths corresponding to the PCC curve segments PCC1 to PCC6 are MP1 to MP6, respectively. The measurement paths MP1 to MP6 can be understood to be a connected plurality of measurement paths. A total number of PCC curve segments is defined as n (n being an integer equal to or greater than 2), and the parameter i (indicating the number of the PCC curve segment) fulfills the relationship $1 \leq i \leq n$. In such a case, the starting point of the $i^{th}$ PCC curve segment is Pi and the end point is P(i+1).

In FIG. 13, n=6. Thus, in this example, the starting point of the PCC curve segment PCC1 is point P1. The end point of the PCC curve segment PCC1 and the starting point of the PCC curve segment PCC2 are both point P2. The end point of the PCC curve segment PCC2 and the starting point of the PCC curve segment PCC3 are both point P3. The end point of the PCC curve segment PCC3 and the starting point of the PCC curve segment PCC4 are both point P4. The end point of the PCC curve segment PCC4 and the starting point of the PCC curve segment PCC5 are both point P5. The end point of the PCC curve segment PCC5 and the starting point of the PCC curve segment PCC6 are both point P6. The end point of the PCC curve segment PCC6 is point P7.

In FIG. 13, the measured object OBJ of the nominal scanning measurement is positioned upward on the drawing sheet. The coordinate measuring machine 7 performs the form measurement described in the first embodiment using each of the PCC curve segments. In FIG. 13, an indentation 701 is present in the third segment.

Figure 14:
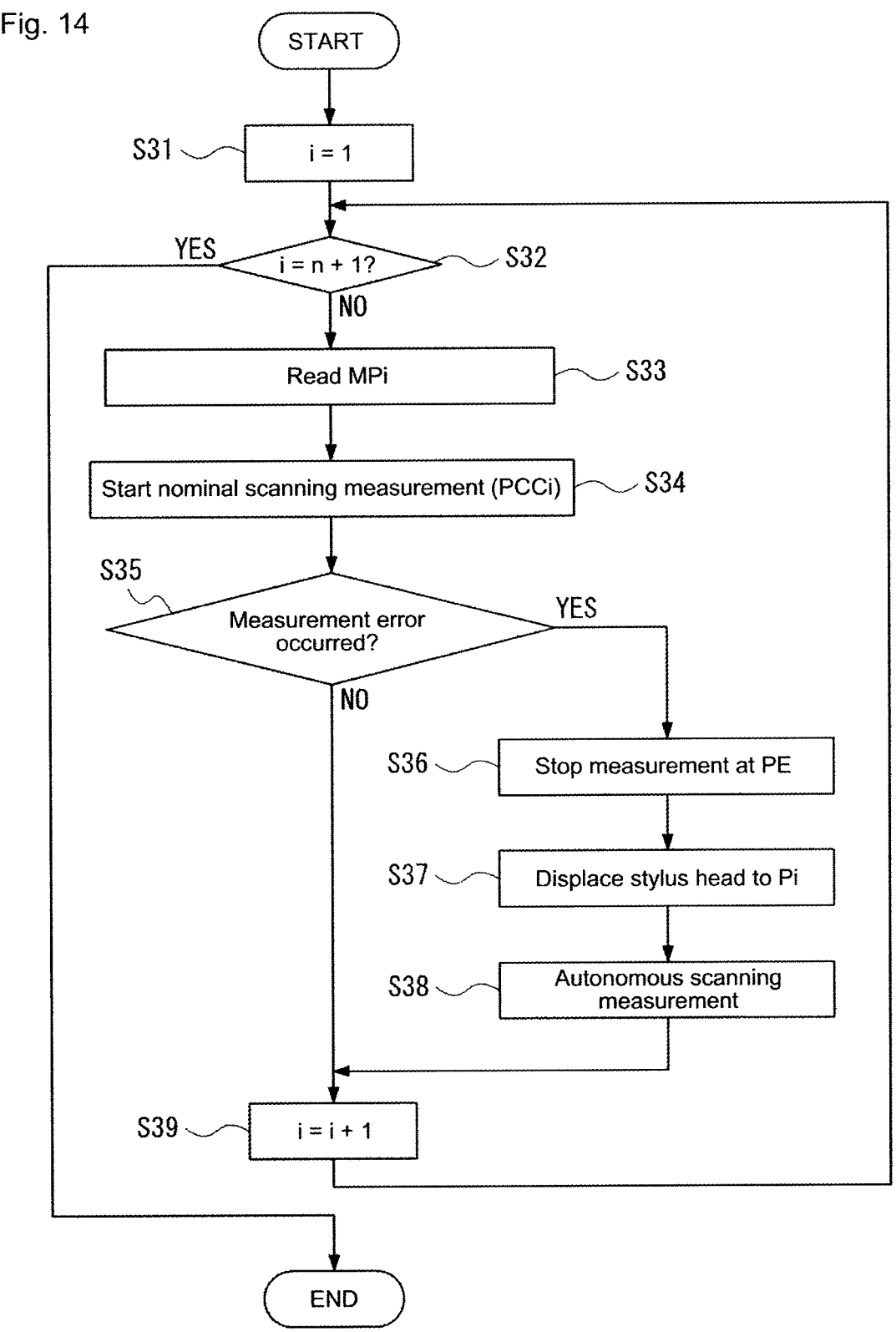
FIG. 14 is a flow chart illustrating a form measurement method of the coordinate measuring machine 7 according to the third embodiment.

Next, form measurement operations of the coordinate measuring machine 7 are described. FIG. 14 is a flow chart illustrating a form measurement method of the coordinate measuring machine 7 according to the third embodiment.

(Step S31)

The parameter definer 35 sets the parameter i, which indicates the number of the PCC curve segments PCCi, to "1."

(Step S32)

The parameter definer 35 determines whether the parameter i is greater than the total number n of the PCC curve segments. Here, the parameter definer 35 determines whether the parameter i is equal to (n+1), i.e., whether (i=n+1). When the parameter definer 35 determines that the parameter i is equal to (n+1), i.e., that (i=n+1), the form measurement ends. Results of the form measurement are stored in the measurement result memory 34.

(Step S33)

When the parameter i is not equal to (n+1), i.e., (i≠n+1), in order to perform nominal scanning measurement of the PCC curve segment PCCi, the displacement controller 33 reads a nominal scanning measurement path MPi (first measurement path) of the PCC curve segment PCCi from the path definer 52.

(Step S34)

The nominal scanning measurement from the starting point Pi to the end point P(i+1) of the PCC curve segment PCCi is initiated. The displacement controller 33 displaces the stylus head 211A from the starting point Pi to the end point P(i+1) of the PCC curve segment PCCi, along the measurement path MN. During the nominal scanning measurement, the position detector 31 detects the position of the stylus head 211A, while the depression amount detector 32 detects the amount of depression of the stylus head 211A toward the measured object OBJ.

(Step S35)

During the nominal scanning measurement from the starting point Pi to the end point P(i+1) of the PCC curve segment PCCi, the depression amount detector 32 monitors the amount of depression of the stylus head 211A toward the measured object OBJ. Also, similarly to step S13 in FIG. 7, when the amount of depression of the stylus head 211A toward the measured object OBJ is outside the allowed range, the depression amount detector 32 detects this as a measurement error. In the example of FIG. 13, an error is detected at the third PCC curve segment PCC3. The allowed range for the amount of depression toward the measured object OBJ can be defined as a range shown in Formula 3, below, for example, using the absolute value of the amount of depression shown in Formula 1, given above. In Formula 3, units are in mm.

[Formula 3]

$$0.05 < |\vec{Ep}| < 0.7 \quad (3)$$

(Step S36)

In a case where the depression amount detector 32 detects a measurement error during the nominal scanning measurement from the starting point Pi to the end point P(i+1) of the PCC curve segment PCCi, the displacement controller 33 stops measurement at the error origination point PE. The position detector 31 stores the error origination point PE.

(Step S37)

The displacement controller 33 drives the probe 21, and displaces the stylus head 211A from the error origination point PE to the starting point Pi of the PCC curve segment PCCi. At this point, the displacement controller 33 displaces the stylus head 211A along the measurement path MPi of the nominal scanning measurement.

(Step S38)

The autonomous scanning measurement from the starting point Pi to the end point P(i+1) of the PCC curve segment PCCi is initiated. The displacement controller 33 displaces the stylus head 211A from the starting point Pi to the end point P(i+1) of the PCC curve segment PCCi, such that the amount of depression of the stylus head 211A toward the measured object OBJ is fixed. During the autonomous scanning measurement, the position detector 31 detects the position of the stylus head 211A, while the depression amount detector 32 detects the amount of depression of the stylus head 211A toward the measured object OBJ.

(Step S39)

When no measurement error is detected in step S35, or after the autonomous scanning measurement of step S38 has ended, the parameter definer 35 adds "1" to the parameter i, i.e., (i=i+1). Thereafter, the process returns to step S32.

In the above, an example is described in which a measurement error occurs at the third PCC curve segment PCC3; however, there may of course be a case where measurement errors occur at two or more PCC curve segments.

As described above, the coordinate measuring machine 7 initiates the nominal scanning measurement in order to perform high-speed form measurement on the plurality of connected PCC curve segments. During the nominal scanning measurement, in a case where the stylus head displaced along the measurement path is unable to fully track the deviation of the surface of the measured object due to an indentation on the measured object, for example, a measurement error is detected. Then, when the measurement error is detected, the measurement method switches to the autonomous scanning measurement and form measurement of a segment where the measurement error occurred is resumed. Specifically, the coordinate measuring machine 7 performs autonomous scanning measurement, rather than nominal scanning measurement, on the segment where the measurement error has occurred. As a result, form measurement can be performed on the plurality of connected PCC curve segments without interruption, even when a segment where a measurement error occurred is present.

Fourth Embodiment

Next, a description is given of a coordinate measuring machine 9 according to a fourth embodiment. The coordinate measuring machine 9 is a modification of the coordinate measuring machine 7 according to the third embodiment. After the form measurement using the plurality of connected PCC curve segments, the coordinate measuring machine 9 is capable of re-defining, based on the results of the autonomous scanning measurement, the measurement path of the nominal scanning measurement of the PCC curve segment where a measurement error occurred.

Figure 15:
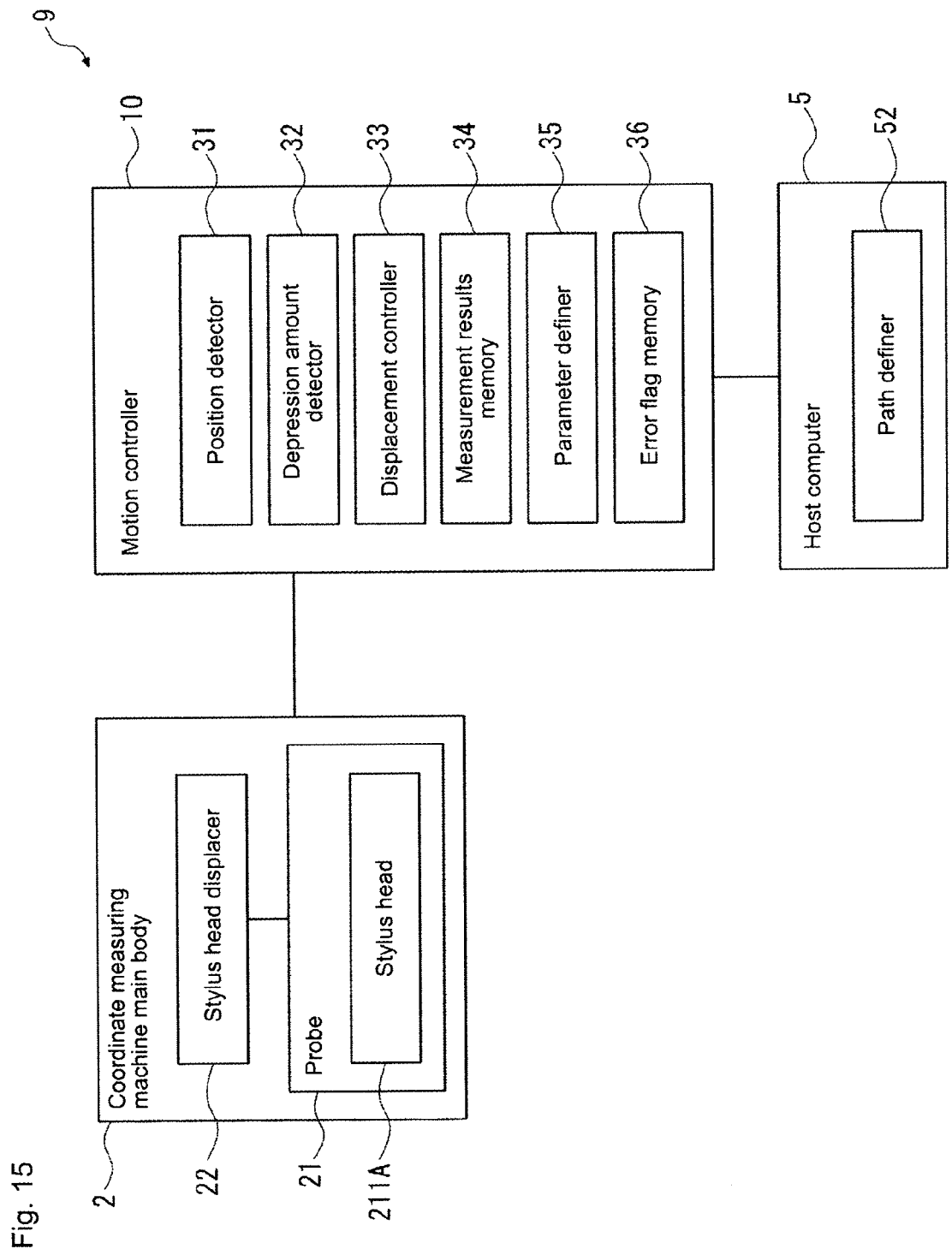
FIG. 15 is a block diagram illustrating a basic configuration of a coordinate measuring machine 9 according to a fourth embodiment.

FIG. 15 is a block diagram illustrating a basic configuration of the coordinate measuring machine 9 according to the fourth embodiment. The coordinate measuring machine 9 replaces the motion controller 8 of the coordinate measuring machine 7 with a motion controller 10. The motion controller 10 adds an error flag memory 36 to the motion controller 8 of the coordinate measuring machine 7. Other configurations of the coordinate measuring machine 9 are similar to those of the coordinate measuring machine 7 and descriptions thereof are therefore omitted.

In a case where a measurement error is detected during form measurement of the plurality of PCC curve segments, the error flag memory 36 stores an error flag output by the depression amount detector 32.

Figure 16:
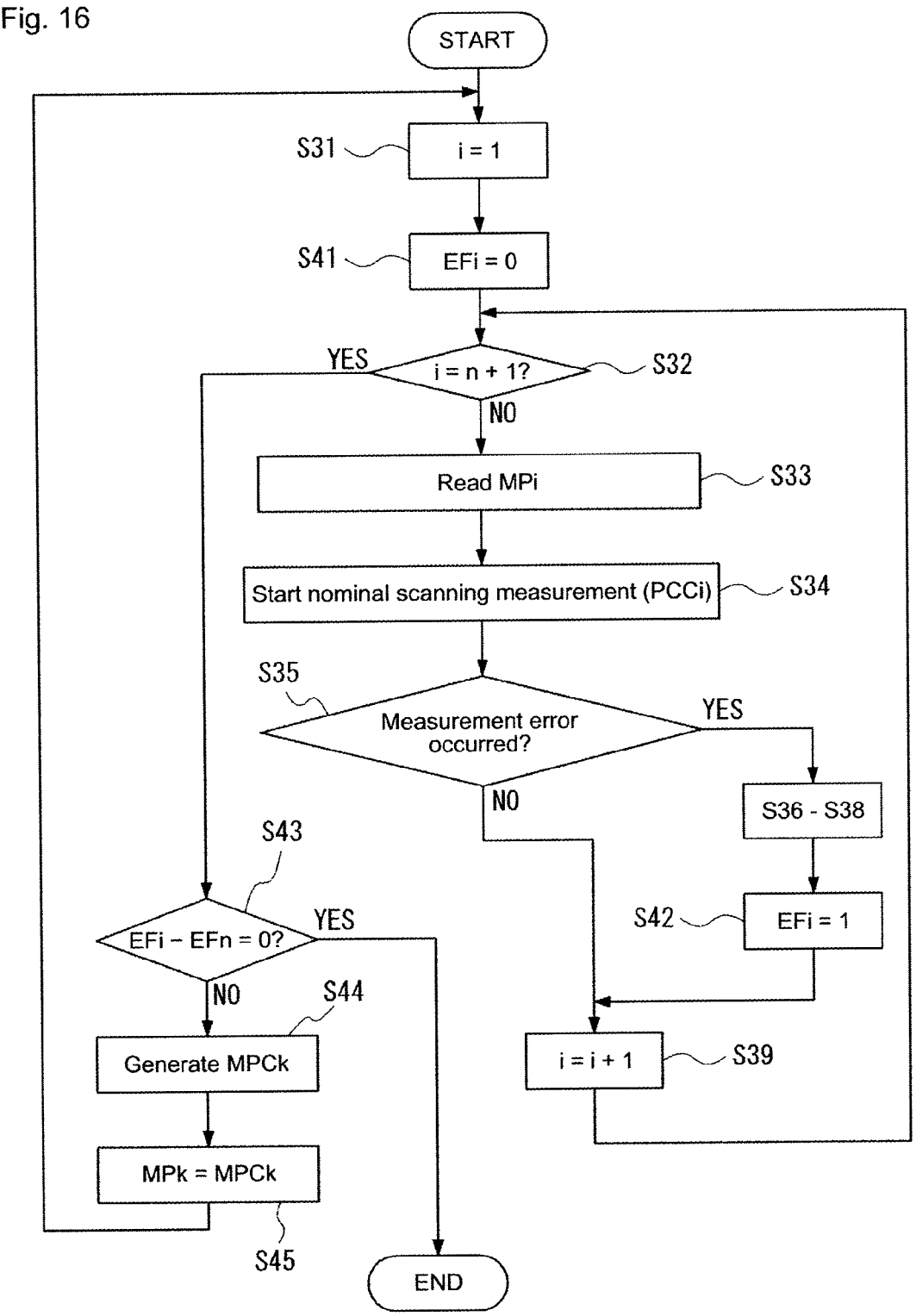
FIG. 16 is a flow chart illustrating a form measurement method of the coordinate measuring machine 9 according to the fourth embodiment.

Next, form measurement operations of the coordinate measuring machine 9 are described. FIG. 16 is a flow chart illustrating a form measurement method of the coordinate measuring machine 9 according to the fourth embodiment. In FIG. 16, step S41 is inserted between steps S31 and S32 of FIG. 14; step S42 is inserted between steps S38 and S39 of FIG. 14; and steps S43 to S45 are added. Steps S36 to S38 are similar to those of FIG. 14, and thus are depicted in a simplified form in FIG. 16 in order to simplify the figure. Hereafter, steps S41 to S45 are described.

(Step S41)

After step S31, the depression amount detector 32 defines an error flag EFi as "0." The depression amount detector 32 writes "0" into the error flag memory 36 as the error flag EFi.

(Step S42)

After step S38, the depression amount detector 32 defines the error flag EFi as "1." The depression amount detector 32 writes "1" into the error flag memory 36 as the error flag EFi. Moreover, writing "1" into the error flag memory 36 as the error flag EFi is referred to simply as writing the error flag to the error flag memory 36.

(Step S43)

In a case where the parameter i is equal to (n+1), i.e., (i=n+1), in step S32, the path definer 52 references error flags EF1 to EFn, which have been written to the error flag memory 36. The path definer 52 confirms whether all of the error flags EF1 to EFn are "0."

(Step S44)

In a case where any error flag from among the error flags EF1 to EFn is "1," the path definer 52 obtains the results of the autonomous scanning measurement from the motion controller 10 for any PCC curve segment having an error flag of "1." Here, the number of the PCC curve segment having an error flag of "1" is defined as k (where k is an integer fulfilling the relationship 1<k<n). Based on the obtained results of the autonomous scanning measurement, the path definer 52 generates a nominal scanning measurement path MPCk (second measurement path) of a PCC curve segment PCCk having an error flag of "1."

(Step S45)

The path definer 52 updates the existing nominal scanning measurement path MPk of the PCC curve segment PCCk using the newly generated nominal scanning measurement path of the PCC curve segment PCCk having an error flag of "1" (MPk=MPCk). Thereafter, the process returns to step S31.

Above, in a case where a measurement error is detected and the autonomous scanning measurement is performed, based on the results of the autonomous scanning measurement, the coordinate measuring machine 9 according to the present embodiment is capable of updating the measurement path of the nominal scanning measurement of the PCC curve segment in which the error occurred. As a result, by performing the nominal scanning measurement along the updated measurement path, form measurement can continue even in a case where a PCC curve segment is present in which a measurement error occurred in the nominal scanning measurement of the plurality of connected PCC curve segments.

Fifth Embodiment

Figure 17:
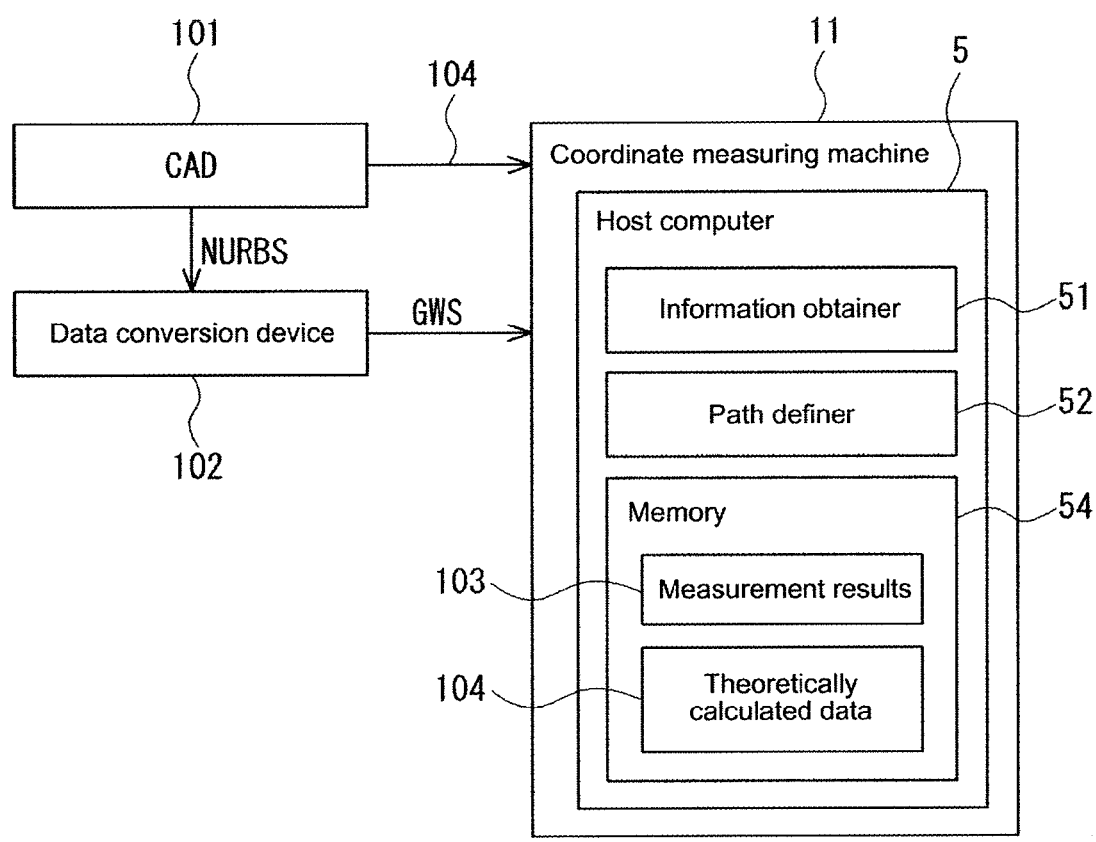
FIG. 17 is a block diagram illustrating a coordinate measuring machine 11 and peripheral equipment according to a fifth embodiment.

Next, a description is given of a coordinate measuring machine 11 according to a fifth embodiment. FIG. 17 is a block diagram illustrating a coordinate measuring machine 11 and peripheral equipment according to the fifth embodiment. The coordinate measuring machine 11 can employ any of the coordinate measuring machines 1, 6, 7, and 9 according to the above-described embodiments. Hereafter, an exemplary method of accurately calculating a measurement path based on design data is described with reference to FIG. 17. Moreover, in order to simplify the figure, FIG. 17 illustrates only configurations necessary to understanding the method of readily obtaining the measurement path for nominal scanning measurement according to the present embodiment.

A NURBS curve is used as free curve data representing the form of the measured object in a design supporter such as a CAD 101. A data conversion device 102 obtains the NURBS curve from the CAD 101. Then, the data conversion device 102 extracts points on the NURBS curve and converts the points to point group data GWS. Moreover, a conversion operation in which the points on the NURBS curve are extracted and converted to the point group data GWS may also be performed by the host computer 5. In such a case, the host computer 5 is a device equivalent to the data conversion device 102, or the host computer 5 can be understood to include the data conversion device 102.

However, the data conversion device 102 has enormous computation requirements for converting the NURBS curve to the point group data GWS. Therefore, the data conversion device 102 has a tendency to be a large-scale, expensive device. When an economic situation of a user of the coordinate measuring machine is considered, a measurement path of nominal scanning measurement can preferably be obtained without using CAD or the data conversion device 102.

Therefore, in the present embodiment, a description is given of a method for readily obtaining a measurement path of nominal scanning measurement.

In a case where a three-dimensional CAD model or the like cannot be used, the coordinate measuring machine 11 uses measurement results 103, in which a form of a measured object was measured, or theoretically calculated point data 104 indicating the form of the measured object and generates a PCC curve to be used by the coordinate measuring machine 11.

In the following, a case is described using the measurement results 103. The measurement results 103, in which the form of the measured object is measured by the coordinate measuring machine 11, are stored in the memory 54 of the host computer 5, for example. The measurement results 103 use the measurement results of a case where a master copy work piece, for example, was measured.

The measurement results 103 are data configured by collecting a plurality of measurement points obtained by measuring the form of the measured object with the coordinate measuring machine 11. Data for one measurement point PM can be notated as (XM, YM, ZM) using the X, Y, and Z axes respectively. The data for the measurement point PM indicates a position of the surface of the measured object. In addition, a normal direction corresponding to the measurement point matches a direction linking a reference position of a center coordinate of the stylus head 211A and detected values (Px, Py, Pz) for each of the probe sensors, indicating the amount of displacement of the stylus 211. Thereby, a unit normal vector can be found. As a result, the point group data GWS can be obtained from the measurement point PM and the unit normal vector.

Next, a case is described using the theoretically calculated point data 104. A theoretically calculated point indicating the shape of the measured object can be obtained by the CAD 101 of the measured object, for example, or by design information from design drawings or the like. The theoretically calculated point data 104 is, for example, calculated by the CAD 101 or the host computer 5 and is stored in the memory 54 of the host computer 5. In a case where the form of the measured object can be expressed by or can closely resemble a simple graphics primitive such as a sphere, cylinder, or plane, the theoretically calculated point data 104 defines a spiral- or sine wave-shaped measurement path on the surface of the measured object and a point group on the defined measurement path is found. For example, in a case where the surface of the measured object is a sphere, the point group data GWS can be obtained by defining coordinates of a point on the measurement path and defining a unit vector directed from the center of the sphere toward that point as a normal vector. In a case where the surface of the measured object is a cylinder, a direction from a center axis of the cylinder toward the surface of the cylinder in a cross-section of the cylinder may be treated as the normal vector direction. In a case where the surface of the measured object is a plane, a direction along a normal line of the plane and oriented from an interior toward an exterior of the measured object may be treated as the normal vector direction.

In any of the above-noted cases, by combining the plurality of measurement points PM with the corresponding normal vectors, data encompassing X axis, Y axis, and Z axis coordinates and the normal vectors can be integrated. Also, in a case using theoretically calculated points, data encompassing X axis, Y axis, and Z axis coordinates and the normal vectors can be integrated similarly.

By performing offset processing on each of the points based on the integrated data, a PCC curve group can be obtained.

As noted above, according to the present embodiment, the PCC curve group can be readily obtained from existing form measurement results and theoretically calculated points of the measured object. Thereby, no dedicated equipment for obtaining the point group data GWS from the NURBS data is required, and thus the coordinate measuring machine can be used at a low cost.

Moreover, the above-noted methods for obtaining a normal vector are merely exemplary and do not exclude obtaining a normal vector using other methods.

Other Embodiments

Moreover, the present invention is not limited to the embodiments described above, and may be modified as needed without departing from the scope of the present invention. For example, in the above-described embodiments, coordinate measuring machines were described; however, such descriptions are merely exemplary. For example, form measurement according to the above-noted embodiments can be applied to not only a coordinate measuring machine, but to any form measuring apparatus.

In the above-described embodiments, a PCC curve was used as a displacement path of a probe; however, this is merely exemplary. Thus, a three-dimensional curve other than the PCC curve or a curve of four or more dimensions can of course also be used as the displacement path of the probe. A form measuring apparatus and form measurement method according to the above-noted embodiments can be executed employing a three-dimensional curve other than the PCC curve or a curve of four or more dimensions.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A form measuring apparatus comprising:
   a probe having a stylus head provided at a distal end thereof;
   a stylus head displacer configured to displace the stylus head along a first measurement path scanning a surface of a measured object;
   a path definer configured to define the first measurement path based on design information for the measured object;
   a displacement controller configured to obtain the first measurement path from the path definer, and further configured to control the stylus head displacer such that the stylus head displaces along the first measurement path;
   a position detector configured to detect a position of the stylus head on the first measurement path;
   a depression amount detector configured to detect an amount of depression of the stylus head toward the measured object along the first measurement path; and
   a measurement results memory configured to store the detected position and amount of depression of the stylus head as measurement results,
   wherein:
   the depression amount detector outputs an error signal when a measurement error occurs in which the amount of depression of the stylus head exceeds an allowed range, and
   the displacement controller is further configured to control the stylus head displacer such that:
      displacement of the stylus head is stopped in response to the error signal;
      the stylus head is displaced to a starting point of the first measurement path; and
      the stylus head is displaced from the starting point to an end point of the first measurement path while scanning the surface of the measured object with a fixed amount of depression of the stylus head toward the measured object.

2. The form measuring apparatus according to claim 1, wherein the path definer is further configured to:
   obtain, from the measurement results memory, measurement results stored by displacing the stylus head from the starting point to the end point of the first measurement path while scanning the surface of the measured object with a fixed amount of depression of the stylus head toward the measured object;
   generate a second measurement path based on the obtained measurement results; and
   update the first measurement path with the second measurement path.

3. The form measuring apparatus according to claim 1, wherein, in a case where a plurality of connected first measurement paths are present, the displacement controller detects the measurement error for each of the connected plurality of first measurement paths.

4. The form measuring apparatus according to claim 3 further comprising:
   an error flag memory configured to store an error flag, the error flag indicating a first measurement path from among the connected plurality of first measurement paths where a measurement error was detected, wherein:
   the depression amount detector writes the error flag to the error flag memory for each of the connected plurality of first measurement paths in a case where a measurement error was detected, and the path definer is further configured to:
reference the error flag and detects the first measurement path from among the connected plurality of first measurement paths where a measurement error was detected;
for all first measurement paths where a measurement error was detected, obtain from the measurement results memory measurement results stored by displacing the stylus head from the starting point to the end point while scanning the surface of the measured object with a fixed amount of depression of the stylus head toward the measured object;
generate a second measurement path based on the obtained measurement results; and
update the first measurement path with the second measurement path.

5. The form measuring apparatus according to claim 2, wherein in a case where the error signal is output from the depression amount detector, the displacement controller:
defines an arbitrary point on the first measurement path between the starting point and the end point of the first measurement path, and
displaces the stylus head within a plane occupied by the starting point, the end point, and the arbitrary point of the first measurement path.

6. The form measuring apparatus according to claim 4, wherein in a case where the error signal is output from the depression amount detector, the displacement controller:
defines an arbitrary point on the first measurement path between the starting point and the end point of the first measurement path, and
displaces the stylus head within a plane occupied by the starting point, the end point, and the arbitrary point of the first measurement path.

7. The form measuring apparatus according to claim 5, wherein in a case where the starting point of the first measurement path, the end point, and the arbitrary point are aligned on a straight line, the displacement controller:
defines a point of intersection between the first measurement path and a line orthogonal to an intermediate point on the straight line linking the starting point and the end point of the first measurement path; and
displaces the stylus head within a plane occupied by the starting point, the end point, and the point of intersection of the first measurement path.

8. The form measuring apparatus according to claim 6, wherein in a case where the starting point of the first measurement path, the end point, and the arbitrary point are aligned on a straight line, the displacement controller:
defines a point of intersection between the first measurement path and a line orthogonal to an intermediate point on the straight line linking the starting point and the end point of the first measurement path; and
displaces the stylus head within a plane occupied by the starting point, the end point, and the point of intersection of the first measurement path.

9. The form measuring apparatus according to claim 7, wherein in a case where the starting point, the end point, and the arbitrary point of the first measurement path are aligned on a straight line, the displacement controller:
defines three points of intersection between the first measurement path and three lines orthogonal to quadrisection points on the straight line linking the starting point and the end point of the first measurement path; and
displaces the stylus head within a plane occupied by the starting point, the end point, and any one of the three points of intersection of the first measurement path.

10. The form measuring apparatus according to claim 8, wherein in a case where the starting point, the end point, and the arbitrary point of the first measurement path are aligned on a straight line, the displacement controller:
defines three points of intersection between the first measurement path and three lines orthogonal to quadrisection points on the straight line linking the starting point and the end point of the first measurement path; and
displaces the stylus head within a plane occupied by the starting point, the end point, and any one of the three points of intersection of the first measurement path.

11. A form measurement method comprising:
obtaining a measurement path defined based on design information for a measured object, the measurement path scanning a surface of the measured object on which a stylus head provided at a distal end of a probe is displaced;
displacing the stylus head along the measurement path;
detecting a position of the stylus head on the measurement path;
detecting an amount of depression of the stylus head toward the measured object on the measurement path;
obtaining, as measurement results, the detected position and amount of depression of the stylus head; and
in a case where the amount of displacement of the stylus head exceeds an allowed range:
stopping displacement of the stylus head;
displacing the stylus head to a starting point of the measurement path; and
displacing the stylus head from the starting point to an end point of the measurement path while scanning the surface of the measured object with a fixed amount of depression of the stylus head toward the measured object.

* * * * *